United States Patent
Delker et al.

(10) Patent No.: US 9,351,044 B1
(45) Date of Patent: May 24, 2016

(54) DYNAMIC INTERFACE FOR MOBILE DEVICES

(75) Inventors: Jason R. Delker, Olathe, KS (US); John M. Everson, Leawood, KS (US); Gabriel B. Kneisley, San Francisco, CA (US); Jarrod A. Nichols, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 79 days.

(21) Appl. No.: 13/606,018

(22) Filed: Sep. 7, 2012

Related U.S. Application Data (62) Division of application No. 12/343,476, filed on Dec. 23, 2008, now Pat. No. 8,306,522.

(51) Int. Cl.
| | |
|---|---|
| G06F 3/048 | (2013.01) |
| H04N 21/47 | (2011.01) |
| H04N 5/445 | (2011.01) |
| G11B 27/34 | (2006.01) |
| H04N 21/462 | (2011.01) |
| G11B 27/034 | (2006.01) |

(52) U.S. Cl.
CPC .............. *H04N 21/47* (2013.01); *G11B 27/034* (2013.01); *G11B 27/34* (2013.01); *H04N 5/44543* (2013.01); *H04N 21/4622* (2013.01)

(58) Field of Classification Search
CPC .......... H04N 5/44543; H04N 21/4622; H04N 21/47; G11B 27/34; G11B 27/034
USPC ......................................... 715/716, 781, 789
See application file for complete search history.

(56) References Cited

U.S. PATENT DOCUMENTS

| | | | | |
|---|---|---|---|---|
| 5,241,656 A | * | 8/1993 | Loucks et al. ................. | 715/794 |
| 5,390,295 A | * | 2/1995 | Bates et al. ................... | 715/789 |
| 5,461,710 A | * | 10/1995 | Bloomfield et al. .......... | 715/839 |
| 5,487,143 A | * | 1/1996 | Southgate ..................... | 715/790 |
| 5,499,334 A | * | 3/1996 | Staab ............................ | 715/778 |
| 5,640,498 A | * | 6/1997 | Chew ............................ | 715/790 |
| 5,694,561 A | * | 12/1997 | Malamud et al. ............. | 715/805 |
| 5,712,995 A | * | 1/1998 | Cohn ............................ | 715/792 |
| 5,822,123 A | * | 10/1998 | Davis ..................... | A63F 13/12 348/569 |
| 5,831,615 A | * | 11/1998 | Drews et al. .................. | 715/768 |
| 5,892,511 A | * | 4/1999 | Gelsinger et al. ............. | 715/794 |
| 5,905,492 A | * | 5/1999 | Straub et al. .................. | 715/744 |

(Continued)

OTHER PUBLICATIONS

Delker Jason R., et al., Patent Application entitled, "Dynamic Interface for Mobile Devices", filed on Dec. 23, 2008, U.S. Appl. No. 12/343,476.

(Continued)

*Primary Examiner* — Jessica Chuang (57) ABSTRACT

A communications device dynamic interface system is provided. The system comprises an at least one communications device and a dynamic interface application, that when executed on the at least one communications device, arranges a plurality of selectable, viewable panes in a virtual carousel format. The system also displays at least one of data and interactive content within the panes, the data and interactive content received from external sources. The system also changes the viewing sequence of the panes on demand and places less frequently viewed panes in a background area of the interface. The system also archives panes not viewed for a predetermined period of time and deletes panes not viewed for a predetermined period of time.

20 Claims, 6 Drawing Sheets

(56) References Cited

U.S. PATENT DOCUMENTS

| | | | |
|---|---|---|---|
| 6,006,227 A * | 12/1999 | Freeman et al. | 707/695 |
| 6,025,837 A * | 2/2000 | Matthews et al. | 715/721 |
| 6,108,003 A * | 8/2000 | Hall et al. | 715/772 |
| 6,111,614 A * | 8/2000 | Mugura et al. | 348/569 |
| 6,263,396 B1 * | 7/2001 | Cottle | G09G 5/14 |
| | | | 348/E11.021 |
| 6,445,400 B1 * | 9/2002 | Maddalozzo et al. | 715/803 |
| 6,462,757 B1 * | 10/2002 | Kao et al. | 715/783 |
| 6,573,905 B1 * | 6/2003 | MacInnis et al. | 345/629 |
| 6,573,915 B1 * | 6/2003 | Sivan et al. | 715/781 |
| 6,600,500 B1 * | 7/2003 | Yamamoto | 715/795 |
| 6,741,851 B1 | 5/2004 | Lee et al. | |
| 6,782,186 B1 * | 8/2004 | Covell | G06K 9/00711 |
| | | | 386/241 |
| 6,795,926 B1 * | 9/2004 | Matula | G06F 1/3203 |
| | | | 713/300 |
| 6,901,582 B1 * | 5/2005 | Harrison | 717/127 |
| 7,027,040 B2 * | 4/2006 | Rekimoto et al. | 345/173 |
| 7,028,264 B2 * | 4/2006 | Santoro et al. | 715/765 |
| 7,103,367 B2 | 9/2006 | Adams et al. | |
| 7,146,573 B2 * | 12/2006 | Brown et al. | 715/802 |
| 7,203,821 B2 * | 4/2007 | Thimmannagari | 712/228 |
| 7,343,566 B1 * | 3/2008 | Chaudhri et al. | 715/781 |
| 7,356,351 B1 * | 4/2008 | Shah | H04W 52/028 |
| | | | 455/343.1 |
| 7,437,765 B2 * | 10/2008 | Elms | G06F 21/83 |
| | | | 345/615 |
| 7,478,339 B2 * | 1/2009 | Pettiross et al. | 715/779 |
| 7,552,397 B2 * | 6/2009 | Holecek et al. | 715/788 |
| 7,577,918 B2 * | 8/2009 | Lindsay | 715/781 |
| 7,590,945 B2 * | 9/2009 | Sims et al. | 715/781 |
| 7,673,347 B2 * | 3/2010 | James | G06F 21/35 |
| | | | 726/28 |
| 7,683,940 B2 * | 3/2010 | Fleming | G11B 27/034 |
| | | | 348/207.1 |
| 7,707,505 B1 * | 4/2010 | Ohrt et al. | 715/738 |
| 7,735,018 B2 * | 6/2010 | Bakhash | 715/782 |
| 7,818,677 B2 * | 10/2010 | Ruthfield et al. | 715/749 |
| 7,840,237 B2 * | 11/2010 | Panabaker | G06F 9/4443 |
| | | | 235/379 |
| 7,895,528 B2 * | 2/2011 | Keohane et al. | 715/807 |
| 7,933,632 B2 * | 4/2011 | Flynt et al. | 455/569.1 |
| 7,954,064 B2 * | 5/2011 | Forstall et al. | 715/779 |
| 8,028,335 B2 * | 9/2011 | Udezue | G06F 21/51 |
| | | | 726/22 |
| 8,099,392 B2 * | 1/2012 | Paterson et al. | 707/654 |
| 8,165,803 B2 * | 4/2012 | Cho | H04N 21/235 |
| | | | 455/3.02 |
| 8,250,613 B2 * | 8/2012 | Faulkner et al. | 725/86 |
| 8,295,687 B1 * | 10/2012 | Kuspa | G11B 27/005 |
| | | | 386/282 |
| 8,306,522 B1 * | 11/2012 | Delker et al. | 455/419 |
| 8,311,988 B2 * | 11/2012 | Cisler et al. | 707/647 |
| 8,370,853 B2 * | 2/2013 | Giampaolo et al. | 719/318 |
| 8,457,781 B2 * | 6/2013 | Bailey et al. | 700/224 |
| 8,578,283 B2 * | 11/2013 | Whytock | G06F 9/4443 |
| | | | 715/764 |
| 2002/0191028 A1 * | 12/2002 | Senechalle et al. | 345/800 |
| 2003/0020671 A1 * | 1/2003 | Santoro et al. | 345/1.3 |
| 2003/0037243 A1 * | 2/2003 | Gruteser | G06F 21/35 |
| | | | 713/185 |
| 2003/0142139 A1 * | 7/2003 | Brown et al. | 345/800 |
| 2003/0157946 A1 | 8/2003 | Chong | |
| 2004/0015729 A1 * | 1/2004 | Elms | G06F 21/83 |
| | | | 726/34 |
| 2004/0137893 A1 | 7/2004 | Muthuswamy et al. | |
| 2005/0010876 A1 * | 1/2005 | Robertson et al. | 715/782 |
| 2005/0186954 A1 | 8/2005 | Kenney | |
| 2005/0257240 A1 * | 11/2005 | Faulkner et al. | 725/92 |
| 2005/0273845 A1 * | 12/2005 | Urano | G06F 21/34 |
| | | | 726/9 |
| 2006/0031849 A1 * | 2/2006 | Barta et al. | 719/320 |
| 2006/0109101 A1 * | 5/2006 | Genda et al. | 340/521 |
| 2006/0161861 A1 * | 7/2006 | Holecek et al. | 715/782 |
| 2006/0184891 A1 * | 8/2006 | Parker et al. | 715/767 |
| 2006/0224989 A1 * | 10/2006 | Pettiross et al. | 715/779 |
| 2006/0234679 A1 | 10/2006 | Matsumoto et al. | |
| 2006/0294599 A1 | 12/2006 | Sim et al. | |
| 2007/0043790 A1 * | 2/2007 | Kryger | 707/204 |
| 2007/0070066 A1 * | 3/2007 | Bakhash | 345/419 |
| 2007/0074284 A1 * | 3/2007 | Woog | G06F 21/84 |
| | | | 726/16 |
| 2007/0082707 A1 * | 4/2007 | Flynt et al. | 455/564 |
| 2007/0118813 A1 * | 5/2007 | Forstall et al. | 715/805 |
| 2007/0173233 A1 * | 7/2007 | Vander Veen | H04M 1/7255 |
| | | | 455/413 |
| 2007/0180398 A1 * | 8/2007 | McArdle | 715/781 |
| 2007/0186177 A1 | 8/2007 | Both et al. | |
| 2007/0243925 A1 * | 10/2007 | LeMay et al. | 463/20 |
| 2007/0250852 A1 * | 10/2007 | Adams | G11B 27/034 |
| | | | 725/28 |
| 2007/0288536 A1 * | 12/2007 | Sen et al. | 707/204 |
| 2007/0294763 A1 * | 12/2007 | Udezue | G06F 21/51 |
| | | | 726/22 |
| 2008/0009344 A1 * | 1/2008 | Graham et al. | 463/25 |
| 2008/0034016 A1 * | 2/2008 | Cisler et al. | 707/204 |
| 2008/0034039 A1 * | 2/2008 | Cisler et al. | 709/204 |
| 2008/0120716 A1 * | 5/2008 | Hall | G06F 21/88 |
| | | | 726/16 |
| 2008/0120723 A1 * | 5/2008 | Carter et al. | 726/26 |
| 2008/0129648 A1 * | 6/2008 | Hagiwara et al. | 345/1.3 |
| 2008/0163104 A1 * | 7/2008 | Haug | 715/788 |
| 2008/0229037 A1 * | 9/2008 | Bunte et al. | 711/162 |
| 2008/0307017 A1 * | 12/2008 | Lyons et al. | 707/204 |
| 2008/0307352 A1 * | 12/2008 | Chaudhri et al. | 715/788 |
| 2009/0055749 A1 * | 2/2009 | Chatterjee et al. | 715/738 |
| 2009/0109015 A1 * | 4/2009 | Ueno | G06F 21/316 |
| | | | 340/500 |
| 2009/0209230 A1 | 8/2009 | Liu | |
| 2009/0240686 A1 * | 9/2009 | Murali | 707/5 |
| 2009/0244003 A1 * | 10/2009 | Bonnat | 345/157 |
| 2009/0249460 A1 | 10/2009 | Fitzgerald et al. | |
| 2010/0100831 A1 * | 4/2010 | Whytock | G06F 9/4443 |
| | | | 715/764 |
| 2011/0046775 A1 * | 2/2011 | Bailey et al. | 700/224 |
| 2012/0260307 A1 * | 10/2012 | Sambamurthy | G06F 21/554 |
| | | | 726/1 |
| 2014/0148944 A1 * | 5/2014 | Bailey et al. | 700/224 |

OTHER PUBLICATIONS

Office Action Restriction Requirement dated Oct. 20, 2011, U.S. Appl. No. 12/343,476, filed Dec. 23, 2008.

Faipp Office Action dated Mar. 19, 2012, U.S. Appl. No. 12/343,476, filed Dec. 23, 2008.

Notice of Allowance dated Jun. 29, 2012, U.S. Appl. No. 12/343,476, filed Dec. 23, 2008.

Pre-Interview Communication dated Dec. 8, 2011, U.S. Appl. No. 12/343,476, filed Dec. 23, 2008.

* cited by examiner

DYNAMIC INTERFACE FOR MOBILE DEVICES

CROSS-REFERENCE TO RELATED APPLICATIONS

This application is a divisional of and claims priority under 35 U.S.C. §120 to U.S. patent application Ser. No. 12/343,476, filed on Dec. 23, 2008, entitled, "Dynamic Interface for Mobile Devices", by Jason R. Delker, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile electronic devices, for example mobile phones, personal digital assistants, media players, and other devices, may have limited and/or restrictive interfaces. These limitations may comprise small visual displays and/or limited keyboards/keypads. These limitations may result, at least in part, from the small form factors of mobile electronic devices and/or the relatively low price point of mobile electronic devices. With the advancing technologies of mobile communications, the features and services available to mobile electronic devices have increased in sophistication as well as numbers. Some mobile electronic devices provide access to the Internet, for example through email applications and/or web browser applications. Some applications and/or software widgets that execute on mobile devices may feature functionality that periodically refreshes information presented on the electronic device without any user action. At the same time, many mobile electronic devices may lack some or all of the hardware capabilities that promote accessing some of these network-based applications and/or widgets.

SUMMARY

In an embodiment, a communications device dynamic interface system is provided. The system comprises an at least one communications device and a dynamic interface application, that when executed on the at least one communications device, arranges a plurality of selectable, viewable panes in a virtual carousel format. The system also displays at least one of data and interactive content within the panes, the data and interactive content received from external sources. The system also changes the viewing sequence of the panes on demand and places less frequently viewed panes in a background area of the interface. The system also archives panes not viewed for a predetermined period of time and deletes panes not viewed for a predetermined period of time.

In another embodiment, a method of refreshing a dynamic user interface is provided. The method comprises receiving a first transmission of electronic media, determining that at least some of the electronic media is displayable in a pane in the dynamic user interface, and inserting the electronic media into the pane. The method also comprises receiving a second transmission of electronic media and determining that the electronic media received in the second transmission is to be associated with the pane and into which the electronic media received in the first transmission was associated. The method also comprises inserting the electronic media received in the second transmission into the pane into which the electronic media received in the first transmission was inserted. The method also comprises one of continuing to display and not continuing to display the electronic media received in the first transmission wherein panes are one of associated with a non-recurring event and not associated with a non-recurring event and the panes associated with the non-recurring event terminate at the conclusion of the event and wherein at least some of the panes are seasonal and appear in the dynamic interface during specific periods of one of a year, month, week, and other periods of time.

In another embodiment, a method of enforcing security and confidentiality on a communications device using a dynamic interface application is provided. The method comprises receiving a first message indicating that the security of the communications device has been compromised, authenticating the first message, and processing the instructions contained in the first message to safeguard content marked confidential, the content associated with panes of the dynamic interface application. The method also comprises rendering inaccessible panes marked confidential by one of deleting and temporarily disabling access to marked panes and disabling selected functionality of the dynamic interface application and underlying communications functionality of the communications device until receiving further instruction. The method also comprises receiving a second message indicating that the security of the communications device is no longer compromised and enabling previously disabled functionality and restoring previously disabled panes pursuant to instructions contained in the second message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a dynamic interface for mobile devices are disclosed that promote a more dynamic interaction and richer overall experience for mobile device users. Mobile device interfaces may comprise a large number of controls, for example tiles associated with applications, web pages, and widgets. Some of the controls may be used only rarely or only during specific periods of time. The dynamic interface provides methods for managing these controls to increase the convenience and usability of the interface of the mobile devices.

In an embodiment, the dynamic interface may be based on a virtual carousel presentation, where controls are disposed in the viewable screen, to the right of the viewable screen, and to the left of the viewable screen. By scrolling to the right, controls that are to the right of the viewable screen come into view while other controls go off screen to the left. By scrolling to the left, controls that are to the left of the viewable screen come into view while other controls go off screen to the right. This kind of interface can be conceptualized as a virtual carousel that contains all of the controls. In other embodiments, however, a virtual carousel may not be used and another kind of interface may be employed.

In an embodiment, the interface controls may comprise tiles as well as other conventional controls such as buttons, drop-down menus, and other known controls. The tiles contain actively running applications displaying viewable data and/or interactive content selected by the viewer. The data or interactive content may be dynamically refreshed without action by the user or changed at the user's discretion. The user decides on the specific content to be displayed in each tile, the order of the tiles in the virtual carousel, and how long a tile is to remain in the carousel. The system allows a user to create and download tiles for a single or short term use. The system allows tiles to be seasonal, such that they are actively displayed in the carousel during certain times of the year. The system allows tiles to be linked to specific events with the system periodically updating information displayed in the tile or tiles as the event progresses with the tile(s) deleted at the conclusion of the event.

Tiles that are frequently viewed may be grouped toward the front of the virtual carousel and/or nearer the in-view controls of the interface. Tiles that are not accessed for an extended period of time may migrate toward the back of the virtual carousel and/or further from the in-view controls of the interface. Tiles that are not accessed for a predefined period of time may be archived or deleted. The user may scroll right and left through the tiles as they appear in the order chosen by the user and may skip over tiles. In an embodiment, scrolling continuously right or left through the series of chosen tiles eventually brings the user back to the user's starting tile. The tiles may be scrolled through horizontally with the most frequently used tiles remaining together and displayed near the front of the virtual carousel. The user has the option to create and add new tiles, delete existing tiles, and change the duration that one or more tiles remain actively in the virtual carousel.

While some of the tiles in the dynamic interface may have traditional functionality found in mobile telephones such as storing contact information, electronic mail processing, and text messaging, the dynamic interface provides the opportunity to create customized, personalized tiles that display and refresh electronic content chosen by the user. The electronic content may be delivered to the mobile device by a service provider using the really simple syndication (RSS) or other data feed format used to publish frequently updated content. The tiles are populated with this information automatically and without user action. Tiles are constructed according to their specific utility such that a tile that displays stock market activity might update itself every minute, a tile displaying sports scores might update every ten minutes, and a tile displaying weather might update every twenty minutes.

In addition to allowing the user to designate one or more tiles for a single use, a specific non-recurring event, and for seasonal use, the dynamic interface permits the user to create profiles such that one set of tiles appears in the dynamic interface during the workday and a second set of tiles appears in the evening. A similar arrangement may be used to organize a user's dynamic interface in one manner during the work week and in a different manner on the weekend. The system also embodies security functionality. If the user loses or misplaces the portable communications device or it is stolen, the user may access an interface on another portable device or on a desktop computer, use credentials to gain secure access, and remotely disable or delete specific tiles and functionality of the dynamic interface and of the device itself. These steps will permit the user to remotely preserve privacy by protecting confidential information viewable on the interface. Should the user later recover the device, the user may access the dynamic interface, enter secure credentials, and re-enable functionality earlier disabled as well as recover tiles made inaccessible after the device was lost, misplaced, or stolen.

Figure 1:
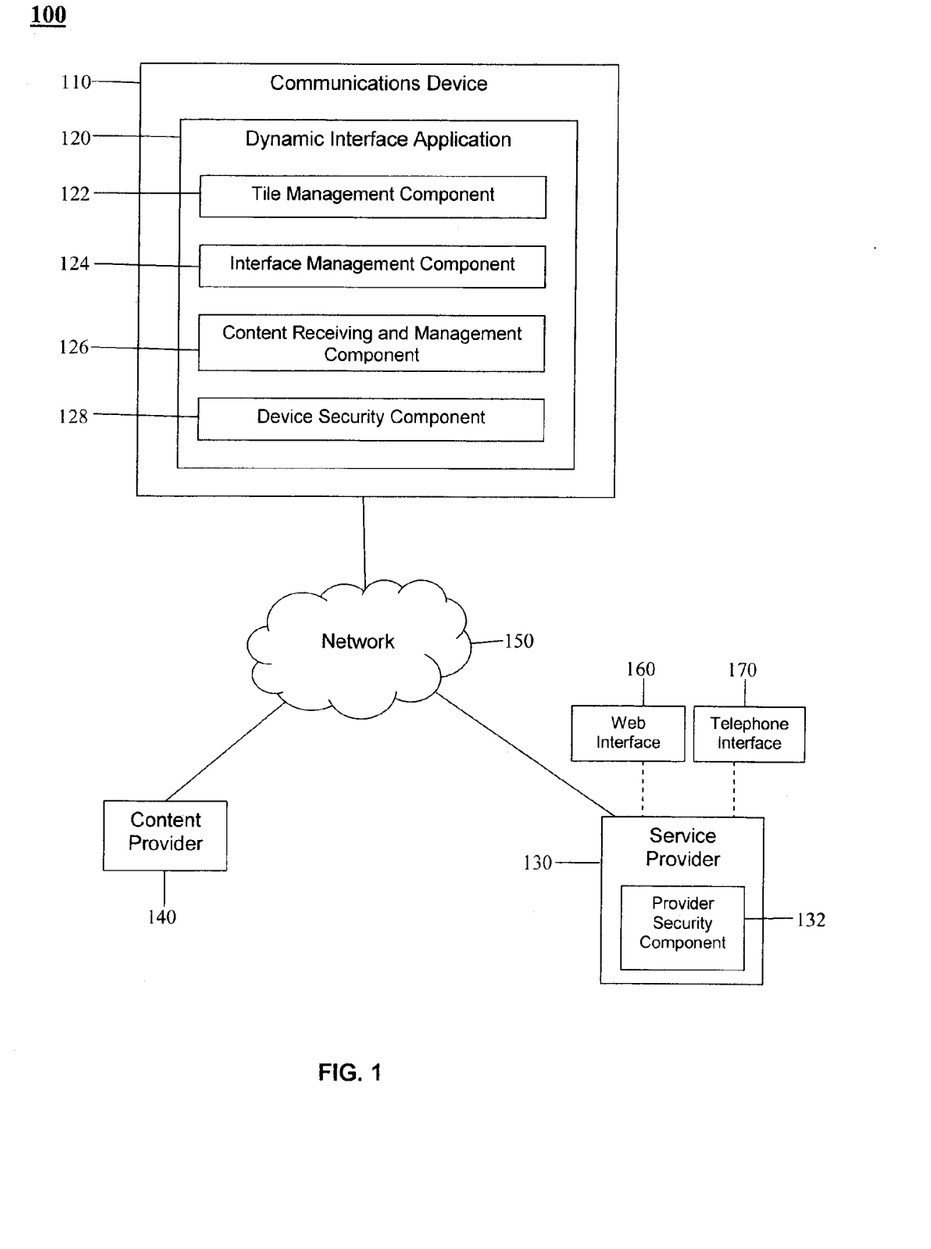
FIG. 1 is a block diagram of a system according to an embodiment of the disclosure.

Turning now to FIG. 1, a system 100 for a dynamic interface is provided. The system 100 comprises a communications device 110, a dynamic interface application 120, a service provider 130, a content provider 140, and a network 150.

The communications device 110 may be a mobile telephone, personal digital assistant (PDA), media player, personal digital television, or other device able to display a graphical user interface with the capability to send, receive, and/or display interactive content. In an embodiment, the communications device 110 may also be a portable computer, laptop computer, desktop computer, or desktop telephone with the necessary described display and interactive capabilities. In an embodiment, the communications device 110 is a mobile telephone depicted as the mobile device 102 in FIG. 4 and described later in detail. The communications device 110 hosts the dynamic interface application 120.

The dynamic interface application 120 is executed on the communications device 110. The dynamic interface application 120 comprises a tile management component 122 that maintains the order of the tiles in the interface and attends to the addition and deletion of tiles to the dynamic interface. The terms pane and tile refer to the same component and may be used interchangeably henceforth. The tile management component 122 receives and carries out instructions about the arrangement of tiles such that the tiles are presented in the desired order. In an embodiment, the tiles are arranged in a virtual carousel format wherein the tiles are in the chosen sequence. In an embodiment, the tile from which the user begins would eventually "come back around" and be displayed again if the user continued to scroll right or left long enough. Whereas the organization of the viewable tiles is described for illustration purposes as being in a specific sequence and the tiles moved as if in a "lazy susan" type of arrangement, in reality the tiles comprise software files stored in directories and called for display by the dynamic interface application 120 by the use of pointers and other well known software methods.

The tile management component 122 maintains the order of the tiles in the dynamic interface and receives and follows instructions regarding changing the order of the tiles. Tiles as viewed by a user may move horizontally from right to left or left to right pursuant to keystrokes or other entries made by the user in the graphical user interface of the dynamic interface application 120. In an embodiment, the dynamic interface may actively house about fifteen total tiles that may be viewed in sequence. At any one time, tabs for about five of those about fifteen total tiles may be visible to the user at the bottom, along one of the sides, or elsewhere in a limited section of the display of the communications device 110. Of the about five tabs displayed at any one time, the full screen for one of the tabs is fully displayed for the user to view and invoke objects on the screen that may represent running applications linked with active Internet connections receiving live feeds of electronic content. Even tiles that are not the currently active tile or do not even have their tabs displayed as one of the about five presently visible in the screen may regularly receive feeds of updated electronic content. The tiles that are constantly refreshed remain current and available for the user to select and view at the user's option. The about five tabs that are visible at a time are displayed in a tessellated or tiled fashion such that the borders of each of the about five tabs are contiguous with one another and the displayed tabs appear to be contiguously abreast of each other in a row across the bottom of, along the side of, or elsewhere in display of the communications device 110. In an embodiment, the tile actively displayed by the communications device 110 may correspond to the center or third of the about five displayed tabs.

The tile management component 122 also creates new tiles and imports existing tiles or tile formats into the dynamic interface. The user of the communications device 110 may create tiles and configure active links to external sources of actively refreshing content from the Internet or other sources. The content is received by the communications device 110 and fed to the appropriate tile and selectable object within the tile via electronic feed using the really simple syndication (RSS) or other data feed format used to publish frequently updated content. The user may also import tiles created by outside content providers 140 and the service provider 130. In an embodiment, the content contained in tiles received from content providers 140 may or may not be modified by the dynamic interface application 120. The newly created or imported tiles are placed in the dynamic interface in the order chosen by the user and remain in the dynamic interface permanently or for a specific period of time chosen by the user. Content providers 140 on the Internet or elsewhere may make their content available in several electronic formats including a tile or pane format that may be readily downloaded and imported by communications devices 110 using the dynamic interface application 120. The availability and delivery of these tiles from outside sources may be affected by the type of service relationship and subscription that the user of the communications device 110 has with its service provider 130 and by the technical capabilities of the communications device 110, the service provider 130, and content providers 140.

The tile management component 122 also archives and deletes tiles that are not accessed for a predetermined time interval. In an embodiment, when a tile is not accessed for the specified time period, the tile management component 122 may remove the tile from the currently viewable group of tiles in the dynamic interface and archive the tile wherein the tile may later be recovered at the option of the user. Tiles that are archived may be bookmarked or indexed enabling a user to quickly locate a desired archived tile and place it back in the dynamic interface. Bookmarking of archived tiles may allow a user to catalog tiles by date, subject matter, or other category. Since tiles may contain embedded links to Internet sites delivering electronic content, bookmarking assists in tracking selected sites. As tiles may contain applications that run on demand, bookmarking a tile may be similar to saving a link to an application in a folder. The tile may also be permanently deleted by the user and not be recoverable.

The tile management component 122 may also enforce policies created in the dynamic interface application 120 regarding limitations on the types of tiles that may be created, imported, and viewed by a user of the communications device 110. Parents may wish to limit content viewable on the communications device 110 by minor children and employers may wish to limit content that employees view on the communications devices 110 provided to employees for business use. Parents, employers, or other parties providing communications devices 110 may create specific usage policies, and the tile management component 122 enforces these policies and may report attempts to circumvent or violate these policies back to the sponsoring parent, employer, or other party.

In an embodiment, one of the tiles may be a home tile or starting tile. This tile may contain a selectable object that points to another tile that itself contains selectable objects linked to actively received content from content providers 140. The selectable objects may also contain tools or other utilities or applications the user may wish to access. In an embodiment, selecting one of the selectable objects in the tile linked to the home or starting tile may link the user directly to one of the other tiles in the dynamic interface.

The dynamic interface application 120 may also comprise the interface management component 124 that changes the positions of tiles in the dynamic interface in accordance with single instance, event, seasonal, and profile specifications. Tiles may be created and imported for a single use such as to remind the user of an appointment, engagement, or to provide material needed for a meeting. Tiles may also be created or imported to accompany a user's participation in a non-recurring event such as a television show, music or cultural festival, or business or political convention. The associated tile or tiles in the user's dynamic interface may be dynamically refreshed to notify the user of imminent events in the festival or convention or to provide schedule changes, announcements, pictures, video, blog entries, or any other dynamically created and furnished content associated with the event. When the event concludes, the tiles associated with the event are configured to automatically be deleted from the user's dynamic interface.

The interface management component 124 also inserts, manages, and removes tiles related to seasonal activities in which the user is interested. Tiles related to sport seasons, television series, and school-year schedules are examples of these types of tiles. During the football season, for example, a user may have one or more tiles in the user's dynamic interface that provide dynamically updated information about football scores, team standings, fantasy football league information, and player news and notes. Because the tiles and the objects within the tiles may be configured as applications that are constantly running, once the tile is created and properly configured, the information desired by the user is automatically received by the dynamic interface application 120 and populated into the appropriate tile for the user's viewing and possible interaction. When the season with which the tile is associated ends, the interface management component 124 removes the tile from the dynamic interface for archiving until the beginning of the next season.

The interface management component 124 also manages profiles that a user may create. A user may have a profile that calls for a certain set of tiles to be in the dynamic interface during the day such as tiles related to stock prices and business activities. The user's employer may populate the user's communications device 110 with one or more tiles containing information important to the user's daily work such as commodity prices or investment analyst reporting. In the evening the user may wish to view a partially or totally different set of tiles that include leisure-related subjects. They same type of profile arrangement may also be used for a user's tiles displayed during the work week and on the weekend.

The dynamic interface application 120 also comprises the content receiving and management component 126 that takes delivery of electronic content received from external sources and directs the content to the appropriate tile and selectable object in the tile. The content receiving and management component 126 manages the active connections to content providers 140 maintained by each of the tiles configured for such connections. Observing content arriving from all sources, the content receiving and management component 126, when necessary, blocks objectionable material, spam, advertising, and any other content not wanted by the user. The content receiving and management component 126 may take directions from rules or policies in effect on the communications device 110 to enforce limitations on the type or quantity of content received, especially if a content provider 140 or service provider 130 may be charging the user for an excessive volume of content or for certain types of content transmitted. If content is not properly received, is received in garbled or corrupt form, or detects that content from an unauthorized source is being sent to the communications device 110, the content receiving and management component 126 may report problems to the user, the service provider 130, and/or the content provider 140.

The dynamic interface application 120 also comprises the device security component 128 that enforces any security features desired by the user. Should the communications device 110 be lost, stolen, or misplaced, the user may invoke functionality from another communications device 110 by activating a security component made available by the service provider 130, entering secure credentials, confirming the identity of the communications device 110 that has been lost, stolen, or misplaced, and providing instructions as to what steps need to be taken to hide or delete certain confidential or personal tiles and perhaps disable certain functionality of the underlying communications device 110. The security component operated by the service provider 130 contacts the device security component 128 with the appropriate instructions. In an embodiment, a user of a communications device 110 may use a friend's mobile telephone equipped with the necessary software interface or may use a web interface on a desktop computer to access the security component operated by the service provider that authenticates the user and forwards instructions on to the device security component 128. Taking these steps will allow the user to remotely secure the communications device 110 by blocking access to tiles containing confidential information as well as underlying device functionality. When the user recovers the communications device 110, the user may enter credentials on the device or on an interface to clear the security lock and re-enable access to the confidential tiles and disabled functionality.

The service provider 130 is a mobile telephone service provider or other entity that provides telephone communication, Internet connectivity, and other communications services to subscribers using communications devices 110. The service provider 130 receives and forwards to communications devices 110 electronic content originated by content providers 140 and requested by communications devices 110. In an embodiment, the service provider 130 may operate certain hardware or software such as special tile server functionality to either assist communications devices 110 in creating tiles or assist them in importing tiles or tile formatting media provided by content providers 140. The service provider 130 assists in forwarding the desired electronic content feeds to the communications devices 110 using the really simple syndication or similar technology.

The service provider comprises a provider security component 132 that a user electronically accesses when a communications device 110 is lost, stolen, or misplaced. The provider security component 132 receives a message from the user, authenticates the user, and contacts the device security component 128 of the communications device 110. The provider security component 132 then relays security instructions received from the user regarding the disabling or deleting of specific tiles and the disabling of functionality to the device security component 128. The device security component 128 resident on the communications device 110 then locally carries out those instructions on the lost, stolen, or misplaced communications device 110.

The content provider 140 is the originator of the electronic content that is provided to the communications devices 110. The content provider 140 may be an Internet web site that provides the content at the request of the communications device 110 in the amounts and at the frequencies chosen by the communications device 110 and under the conditions agreed to by the content provider 140 and the user of the communications device 110. In an embodiment, the user of the communications device 110 may subscribe to certain content periodically provided by the content provider 140. The content may be political commentary or news, sports reporting, academic material, blog content, or private, customized content contracted specifically by the user of the communications device 110.

The content sent by the content provider 140 is received and passed through by the service provider 130 to the communications device 110. The content receiving and management component 126 of the dynamic interface application 120 takes delivery of the electronic content, completes any screening or filtering, determines the tile and associated selectable object within the tile to which the electronic content should be sent, and inserts the content. The content receiving and management component 126 determines whether to replace existing content with new content or to add the new content and leave the existing content in place.

In an embodiment, instead of transmitting just electronic content for placement in an existing tile, the content provider 140 may provide all of the media needed for the dynamic interface application 120 to create a new tile using a tile template. The dynamic interface application 120 may include tools that allow a user to draw on standard tile templates and create a tile that accommodates electronic content provided by a content provider 140. In an embodiment, the content provider 140 may provide a ready-made tile that requires no modification. In an embodiment, the service provider 130 may provide a tile or tile template that permits insertion of content received from a content provider 140.

The network 150 promotes communication between the components of the system 100. The network 150 may be any communication network including a public data network (PDN), a public switched telephone network (PSTN), a private network, and/or a combination thereof.

Figure 2:
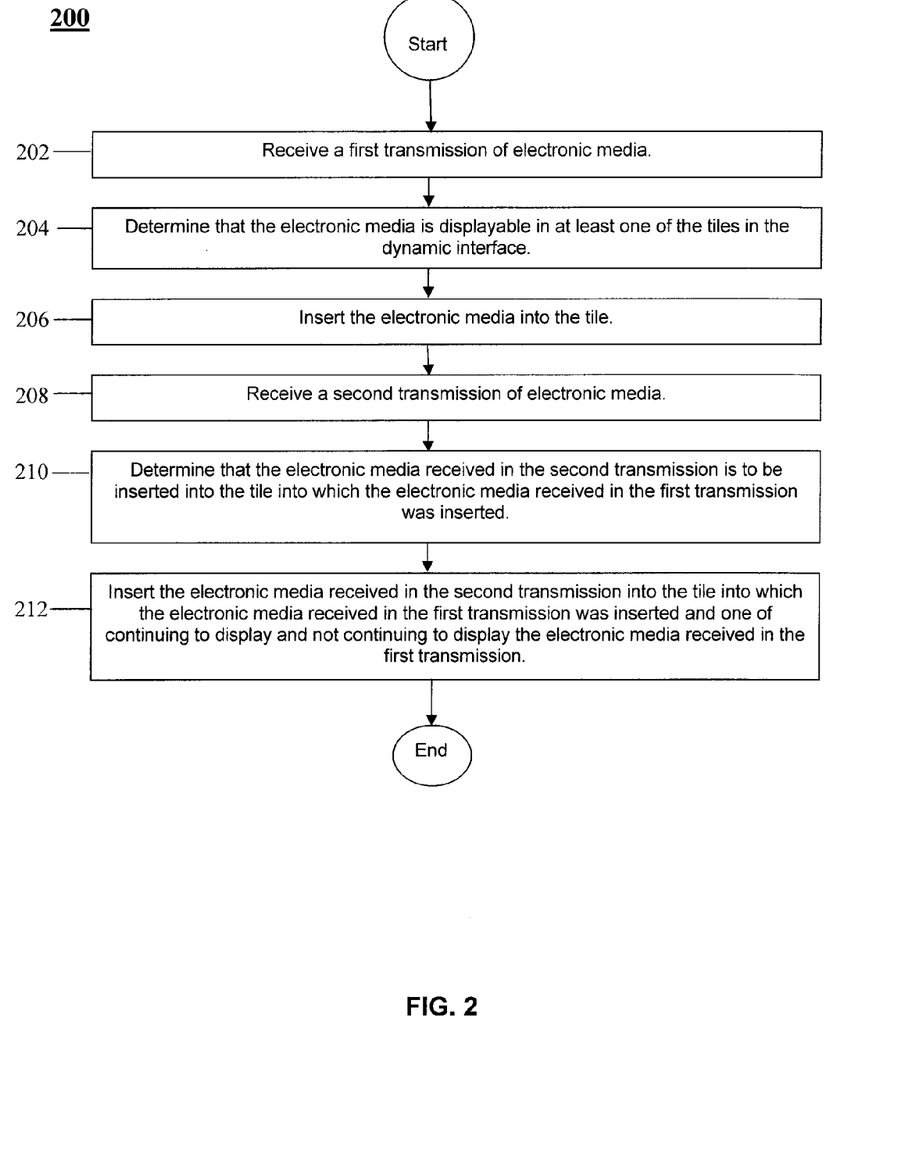
FIG. 2 is a flow chart illustrating a method according to an embodiment of the disclosure.

Turning now to FIG. 2, a method 200 of refreshing a dynamic interface is provided. Beginning at block 202, the dynamic interface application 120 receives a first transmission of electronic media. The electronic media is received per the request of the communications device 110 and it comprises read-only media or interactive media that may be placed in one or more of the tiles in the communications device 110. The tile contains embedded selectable objects that are applications that may be perpetually in a running state including maintaining active connections with content providers 140. When the user wants to view and/or interact with the material in a tile, the user does not have to wait for the tile to initiate a connection with the content provider 140 and wait again for the content provider 140 to return the requested information.

At block 204, the content receiving and management component 126 determines that all or a portion of the received electronic media properly belongs in at least one of the panes in the dynamic interface. The electronic media may contain identifying signals or coding that matches with a master list maintained by the content receiving and management component 126 such that the content may be identified as properly belonging in a specific tile. The correct tile for the received content is determined and the selectable object within the tile with which the electronic content is to be associated is also determined. At block 206, the dynamic interface application 120 inserts the electronic content into the pane and associates the content with the proper selectable object associated with the content.

At block 208, the dynamic interface application 120 receives a second transmission of electronic content. As with block 204, the content receiving and management component 126 first determines that the content should be accepted by the communications device 110 at all and then searches for the correct tile to which the content should be directed. In an embodiment, two separate deliveries of electronic content received from the same content provider 140 may properly be directed to different tiles because the specific electronic content in the two deliveries differs. In another embodiment, content from two separate content providers 140 may at first appear to belong in the same tile. In both embodiments, the content receiving and management component 126 must make an initial determination of whether to accept the transmission followed by a determination of the correct tile to which the electronic content should be directed.

At block 210, the content receiving and management component 126 determines that the media received in the second transmission properly belongs in the same tile and associated with the same selectable object within the tile as the tile and selectable object to which the electronic content received in the first transmission was directed. At block 212, the content receiving and management component 126 inserts the electronic content received in the second transmission into the same tile and selectable object as it inserted the electronic content received in the first transmission. The content receiving and management component 126 must make a determination whether to replace the content from the first transmission with the content from the second transmission or to instead add the content from the second transmission so that the content from the first transmission is not deleted or overwritten and instead remains accessible. Rules accompanying the specific tile will aid the content receiving and management component 126 in making this determination.

Figure 3:
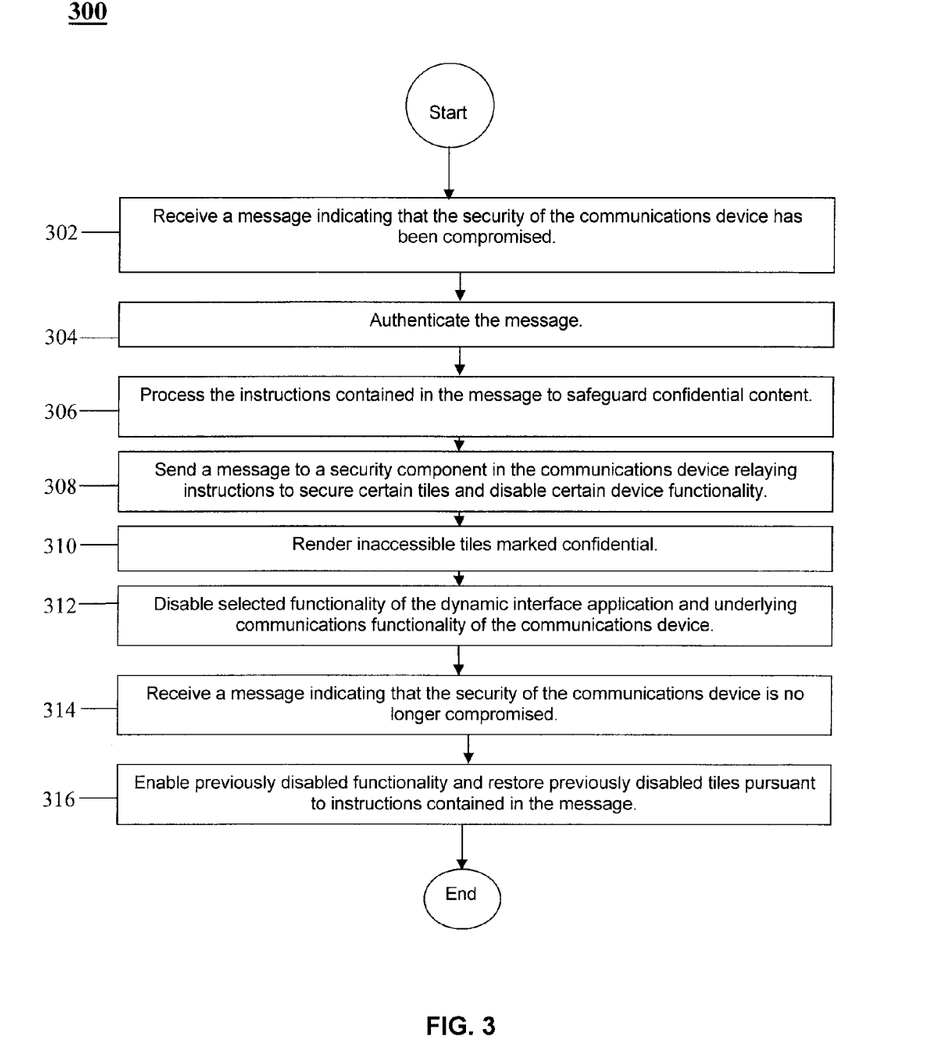
FIG. 3 is a flow chart illustrating another method according to an embodiment of the disclosure.

Turning now to FIG. 3, a method 300 of enforcing security and confidentiality on a communications device 110 using a dynamic interface application 120 is provided. At block 302, the provider security component 132 of the service provider 130 receives a first message that the security of the communications device 110 has been compromised. In an embodiment, the user of the communications device 110 may have lost or misplaced the communications device 110 or it may have been stolen. The user may invoke a security interface on another's mobile telephone—for example, on the mobile phone of a friend, a relative, or a colleague—or may access a security interface on a web interface on a desktop, laptop or portable computer. The user is placed in contact with the provider security component 132 that at block 304 processes credentials received in the first message and authenticates the user and the first message. The user may then enter instructions that the provider security component 132 will process and forward to the device security component 128 directing the device security component 128 to hide or delete specific tiles and disable functionality of the dynamic interface application 120 and of the underlying communications device 110.

Assuming the communications device 110 is powered on, the provider security component 132 will pass on instructions to the device security component 128 and the instructions will be carried out. If the communications device 110 is not currently powered on, the instructions related to the processing of the first message may be saved by the provider security component 132 and forwarded on to the communications device 110 when the communications device 110 is next powered on.

At block 306, the device security component 128 begins processing the instructions contained in the first message. The instructions list the panes in the dynamic interface to either immediately hide or outright delete functionality of the dynamic interface application 120 and communications device 110 to disable. At blocks 308 and 310, the device security component 128 carries out these instructions. A party that attempts to access services on the communications device 110 including viewing the tiles and selectable objects in the tiles will not be able to view the tiles earlier marked confidential by the user and will not be able to use functionality disabled by the user. These hidden tiles and the disabled functionality will remain unavailable until the communications device 110 is recovered and the user elects to restore the hidden tiles and disabled functionality.

At block 312, the provider security component 132 receives a second message indicating that the security of the communications device 110 is no longer compromised. In an embodiment, the message is received because the user has recovered the lost, misplaced, or stolen communications device 110 and wishes to restore hidden tiles and disabled functionality. After examining the credentials received in the second message and authenticating the identity of the user, the provider security component 132 notifies the device security component 128 at block 314 to restore the hidden tiles and enable the previously disabled functionality. The device security component 128 carries out these instructions. The user is then able to fully use the communications device 110 and the dynamic interface application 120.

Figure 4:
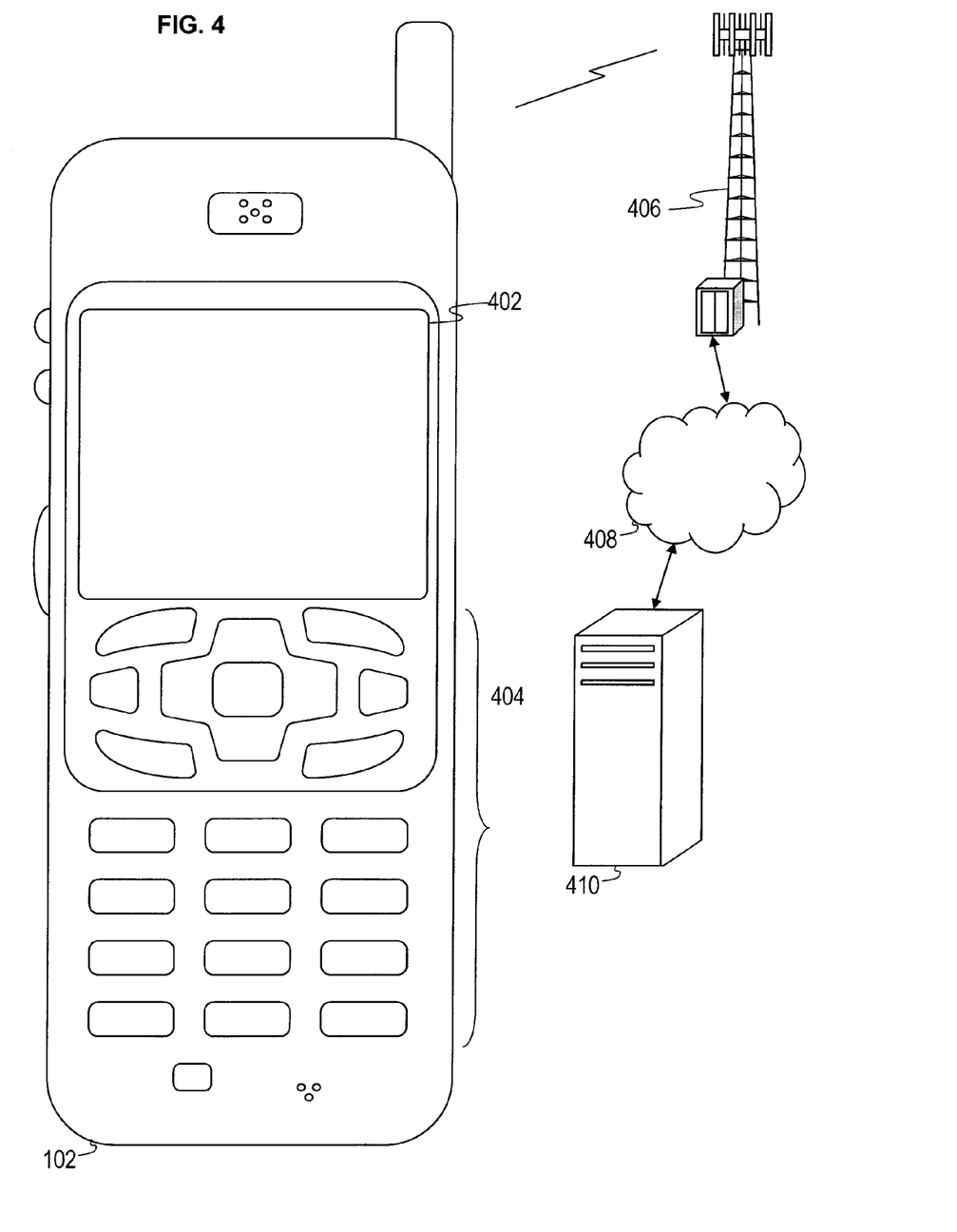
FIG. 4 is an illustration of a mobile device according to an embodiment of the disclosure.

FIG. 4 shows a wireless communications system including the mobile device 102. In an embodiment, the mobile device 102 is equivalent to the communications device 110. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
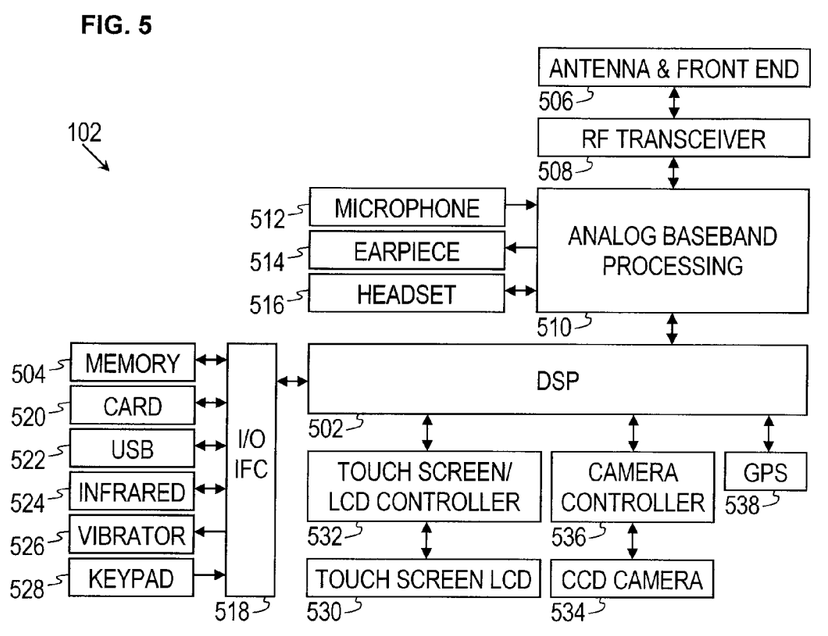
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
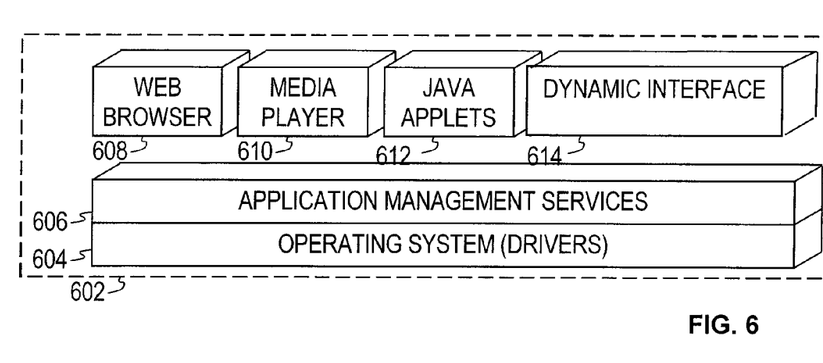
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The dynamic interface 614 corresponds to the dynamic interface application 120 described in the system 100.

Figure 7:
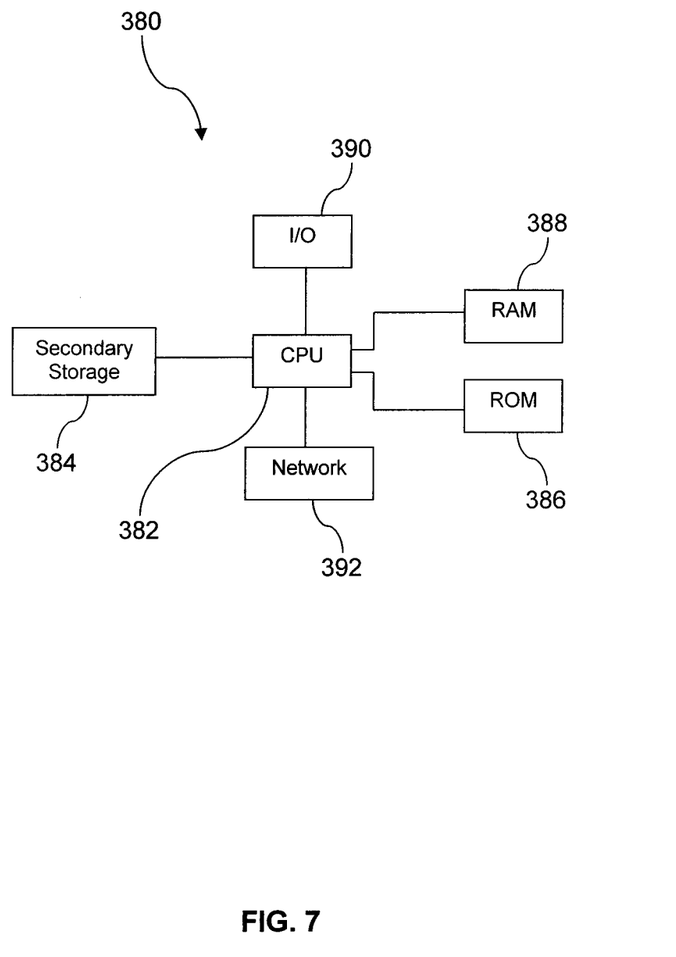
FIG. 7 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communications device system for managing a plurality of panes in a dynamic interface, comprising:
    an at least one communications device associated with a service provider and which provides communication services over a service provider network;
    a dynamic interface application, that when executed on the at least one communications device,
        arranges a plurality of selectable, viewable panes in a virtual carousel format in the dynamic interface,
        displays at least one of data and interactive content within the panes, the data and interactive content received from external sources,
        changes a viewing sequence of the panes on demand,
        places less frequently viewed panes in a background area of the dynamic interface,
        archives panes not viewed for a predetermined period of time, wherein the archived panes are completely removed from the dynamic interface, and wherein the archived panes are bookmarked or indexed by at least one of date or subject matter to enable recovery,
        recovers the archived panes at a user's discretion at a later time, wherein the recovered archived panes are restored to the dynamic interface based on the bookmarking or indexing, and
        deletes panes not viewed for a predetermined period of time, wherein the deleted panes are not recoverable; and
    a device security application, that when executed on the at least one communications device,
        identifies panes of the plurality of selectable viewable panes to be marked confidential when a security compromise occurs,
        identifies functionality of the dynamic interface application and functionality of the communication services to be disabled when the security compromise occurs, and
        upon receipt of a security message from the service provider, renders inaccessible the panes marked confidential by one of deleting and temporarily disabling access to the panes and disables the identified functionality of the dynamic interface application and the identified functionality of the communication services.

2. The system of claim 1, wherein the system periodically receives an electronic transmission from an external source containing at least one of data and interactive media.

3. The system of claim 2, wherein the content received in the electronic transmission is associated with an application accessible in at least one of the selectable, viewable panes in the dynamic interface.

4. The system of claim 2, wherein the content contained in the electronic transmission is one of added to and inserted in replacement of content received in a previous electronic transmission.

5. The system of claim 1, wherein panes and selectable objects within panes one of represent applications in an operative state and point to applications in an operative state.

6. The system of claim 1, wherein tabs representing a subset of the panes are displayed in a portion of the viewing area of the communications device.

7. The system of claim 1, wherein at least some of the data and interactive content is received via really simple syndication (RSS) technology.

8. The system of claim 1, wherein the dynamic interface application places some rarely viewed panes off screen, wherein the dynamic interface application promotes scrolling horizontally to view the otherwise off screen panes.

9. The system of claim 1, wherein the dynamic interface application changes the view sequence of the panes based on an event.

10. The system of claim 9, wherein one of the panes associated with the event is dynamically refreshed to provide notification of at least one of schedule changes, announcements, pictures, or blog entries.

11. The system of claim 9, wherein one of the panes associated with the event is deleted from the dynamic interface.

12. The system of claim 1, wherein the dynamic interface application further disables functionality of the at least one communication device when the at least one communications device is determined to be lost, stolen, or misplaced.

13. A method of managing a plurality of panes in a dynamic interface, comprising:
    arranging, by a dynamic interface application stored on a non-transitory memory and executable by a communications device, a plurality of selectable, viewable panes in a virtual carousel format in the dynamic interface,
    displaying, by the dynamic interface application, at least one of data and interactive content within the panes, the data and interactive content received from external sources,
    changing, by the dynamic interface application, a viewing sequence of the panes on demand,
    placing, by the dynamic interface application, less frequently viewed panes in a background area of the dynamic interface, archiving, by the dynamic interface application, panes not viewed for a predetermined period of time, wherein the archived panes are completely removed from the dynamic interface, and wherein the archived panes are bookmarked or indexed by at least one of date or subject matter to enable recovery, recovering, by the dynamic interface application, the archived panes at a user's discretion at a later time based on the bookmarking or indexing, wherein the recovered archived panes are restored to the dynamic interface, deleting, by the dynamic interface application, panes not viewed for a predetermined period of time, wherein the deleted panes are not recoverable, identifying, by a device security application stored on a non-transitory memory and executable by the communications device, panes of the plurality of selectable viewable panes to be marked confidential when a security compromise occurs, identifying, by the device security application, functionality of the dynamic interface application and functionality of the communication services to be disabled when the security compromise occurs, and upon receipt of a security message from the service provider, rendering inaccessible the panes marked confidential by one of deleting and temporarily disabling access to the panes and disables the identified functionality of the dynamic interface application and the identified functionality of the communication services.

14. The method of claim 13, further comprising periodically receiving an electronic transmission from an external source containing at least one of data and interactive media.

15. The method of claim 14, wherein the content received in the electronic transmission is associated with an application accessible in at least one of the selectable, viewable panes in the dynamic interface.

16. The method of claim 14, wherein the content contained in the electronic transmission is one of added to and inserted in replacement of content received in a previous electronic transmission.

17. The method of claim 13, wherein panes and selectable objects within panes one of represent applications in an operative state and point to applications in an operative state.

18. The method of claim 13, further comprising displaying tabs representing a subset of the panes in a portion of the viewing area of the communications device.

19. The method of claim 13, further comprising maintaining profiles, wherein each profile describes a specific set of panes to be displayed in the dynamic interface for a user during at least one of specific times of a day and specific days of a week.

20. The method of claim 13, wherein the panes in the dynamic interface comprise a home pane, and wherein the home pane contains a pointer to a main menu pane containing selectable objects, the selectable objects representing links to at least one of data and interactive content.

* * * * *